United States Patent
Banavar et al.

(10) Patent No.: US 7,287,694 B2
(45) Date of Patent: Oct. 30, 2007

(54) METHOD AND SYSTEM FOR CONTEXT-BASED AUTOMATED PRODUCT IDENTIFICATION AND VERIFICATION

(75) Inventors: Guruduth Somasekhara Banavar, Yorktown Heights, NY (US); Chatschik Bisdikian, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/925,702

(22) Filed: Aug. 25, 2004

(65) Prior Publication Data

US 2006/0043174 A1    Mar. 2, 2006

(51) Int. Cl.
*G06K 15/00* (2006.01)
(52) U.S. Cl. .................................................. 235/383
(58) Field of Classification Search ............ 235/462.01, 235/383; 382/100; 707/102; 705/29
See application file for complete search history.

(56) References Cited

U.S. PATENT DOCUMENTS

| | | | |
|---|---|---|---|
| 5,883,968 A * | 3/1999 | Welch et al. ............... | 382/100 |
| 6,119,932 A | 9/2000 | Maloney et al. | |
| 6,488,207 B1 * | 12/2002 | Kawai et al. ............... | 235/383 |
| 6,598,791 B2 * | 7/2003 | Keys et al. ................. | 235/383 |
| 6,707,381 B1 * | 3/2004 | Maloney .................. | 340/568.1 |
| 2001/0051905 A1 * | 12/2001 | Lucas ........................ | 705/29 |
| 2003/0018897 A1 | 1/2003 | Bellis, Jr. et al. | |
| 2003/0120677 A1 * | 6/2003 | Vernon ....................... | 707/102 |

FOREIGN PATENT DOCUMENTS

WO      WO 01/35326      5/2001

* cited by examiner

*Primary Examiner*—Michael G. Lee
*Assistant Examiner*—Tae W. Kim
(74) *Attorney, Agent, or Firm*—Keusey, Tutunjian & Bitetto, P.C.; Anne V. Dougherty, Esq.

(57) ABSTRACT

A method and a system for automated verification and status identification (context) of objects using data about the objects captured via computer-enabled sensing elements are provided. The object may include goods tagged with electronic identifiers. The objects are shipped from one location to another, and identified via their electronic identifiers. The objects are scanned at the various locations by a number of sensing devices. The outcome of sensing is then compared with stored information describing the object and pointed at by their electronic identifier. The comparison is used to automatically verify that the scanned object is as identified and evaluate its condition.

10 Claims, 3 Drawing Sheets

METHOD AND SYSTEM FOR CONTEXT-BASED AUTOMATED PRODUCT IDENTIFICATION AND VERIFICATION

BACKGROUND

1. Technical Field

Exemplary embodiments disclosed herein relate to identifying objects and more particularly to methods and systems for providing automated verification and status identification (context) of objects using data about the objects captured via computer-enabled sensing elements.

2. Description of the Related Art

The introduction of tagging technologies for automated product identification, e.g., bar codes and more recently radio frequency identification (RFID), revolutionizes the supply chain management process. In an ever increasing rate, these technologies permit the integration of the information technology (IT) support infrastructure in an enterprise for tracing the location of products between manufacturing plants, distribution centers, storage facilities, retail outlets, etc. The integration of the IT support infrastructure enables the automation of a supply chain, better tracking of shipments, reduction of human errors in record keeping, on-demand access to shipment status, and so on.

However, tagging techniques are only used in identifying the object/product to which the tag has been attached. Tagging techniques cannot identify the status of an object, potential mismatches, etc. For example, it would be beneficial not only to be told that a shipped object is a washing machine, but be able to verify without human intervention that this is indeed the case, or make a statement of the condition of the shipment (e.g., box is damaged), and initiate appropriate actions if something out of the ordinary has been detected.

Prior art has focused on identification of objects alone (e.g., via the use of bar codes), and identification and verification of objects involving human presence. Bellis, Jr. et al. in U.S. Patent Application no. US 2003/0018897 A1 describe a system and a method for verifying the identity of a customer at a shelf-checkout system. The method comprises capturing an image of a customer's identification at the self-checkout system and displaying the customer's identification at a location remote from the self-checkout system to verify the identity of the customer. Maloney et al. in U.S. Pat. No. 6,119,932 describe an identification verification apparatus and method that is being used to identify individuals and verify that they are eligible to take certain actions, for example, buy tobacco products from a vending machine. Both methods require individuals to supply an identification form, e.g., an ID card, to the system, which can then retrieve information from the ID card that can be used to verify the individuals.

Taylor et al. in PCT Application WO 01/35326 A1 propose a method for identification or verification of an object class using a model based upon appearance parameters that are derived by comparing images of objects of different classes.

The main focus of the prior art has been that of the identification of a random object that "spontaneously" appears at a location to execute some function. This situation is best exemplified by humans appearing at a waiting line, e.g., a check-out line, or a line to a vending machine, to complete a transaction, e.g., buying merchandise.

Due to privacy concerns, automatic identification of humans via electronic surveillance and identification means remains a debatable issue. Supply chains are not faced with such concerns and more and more shipped goods are equipped with RFIDs. This permits the goods to be identified without the need for intervention by a human inspector. However, as mentioned, the mere identification of goods is not sufficient to guarantee that a shipment is in order.

SUMMARY

It would be advantageous to have an improved method and system that will automatically verify that a (shipped) item is indeed what its identification says it is, evaluate the condition of the item, and decide whether it appears, or not appears, at the right place and at the right time.

The present embodiments provide a method and a system for automated verification and status identification (context) of objects using data about the objects captured via computer-enabled sensing elements. The objects may include goods tagged with electronic identifiers. The objects are shipped from one location to another and identified via their electronic identifiers. Moreover, the objects are scanned at the various locations by a number of sensing devices. The outcome of sensing is then compared with stored information describing the object and pointed at by their electronic identifier. The comparison is used to automatically verify that the scanned object is as identified and to evaluate its condition.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Exemplary embodiments disclosed herein aim at addressing the automated verification of objects using context information related to the object. An object as applied herein is a general term that includes anything that needs to be identified and verified, e.g., consumer goods, inventory, or other tangible things that have an identity, physical condition and/or status are also included. The present embodiments take advantage of tagging technologies that identify an object. The identification context information related to the object (e.g., dimensions, weight, color, shape, predefined responses to testing stimuli, shipment logs—to see whether the items were expected in the first place, etc.) is retrieved.

The context information retrieved for an object is subsequently correlated to how the object looks and/or behaves. Based on this, the object can be verified and, if necessary, corrective actions can be initiated. Furthermore, embodiments disclosed can adjust to new products on-the-fly, in that the system does not have to reset every time a new type of product needs to be identified and verified (e.g., after finishing with the washing machines, the dryers can be immediately handled).

It should be understood that the elements shown in the FIGS. may be implemented in various forms of hardware, software or combinations thereof. Preferably, these elements are implemented in a combination of hardware and software used in conjunction with one or more appropriately programmed general-purpose digital computers having a processor and memory and input/output interfaces. System and methods in accordance with this disclosure assists in the identification and verification of shipped goods in a supply chain as these goods are passing via inspection centers at various stops of the supply chain, e.g., a distribution center, a warehouse, a port, etc. It should be understood though that the embodiments described herein are not restricted only to supply chains. By way of example only, exemplary embodiments of the present invention may be applicable not only to a particular product, but also shipping containers, assembly lines, and so on.

Figure 1:
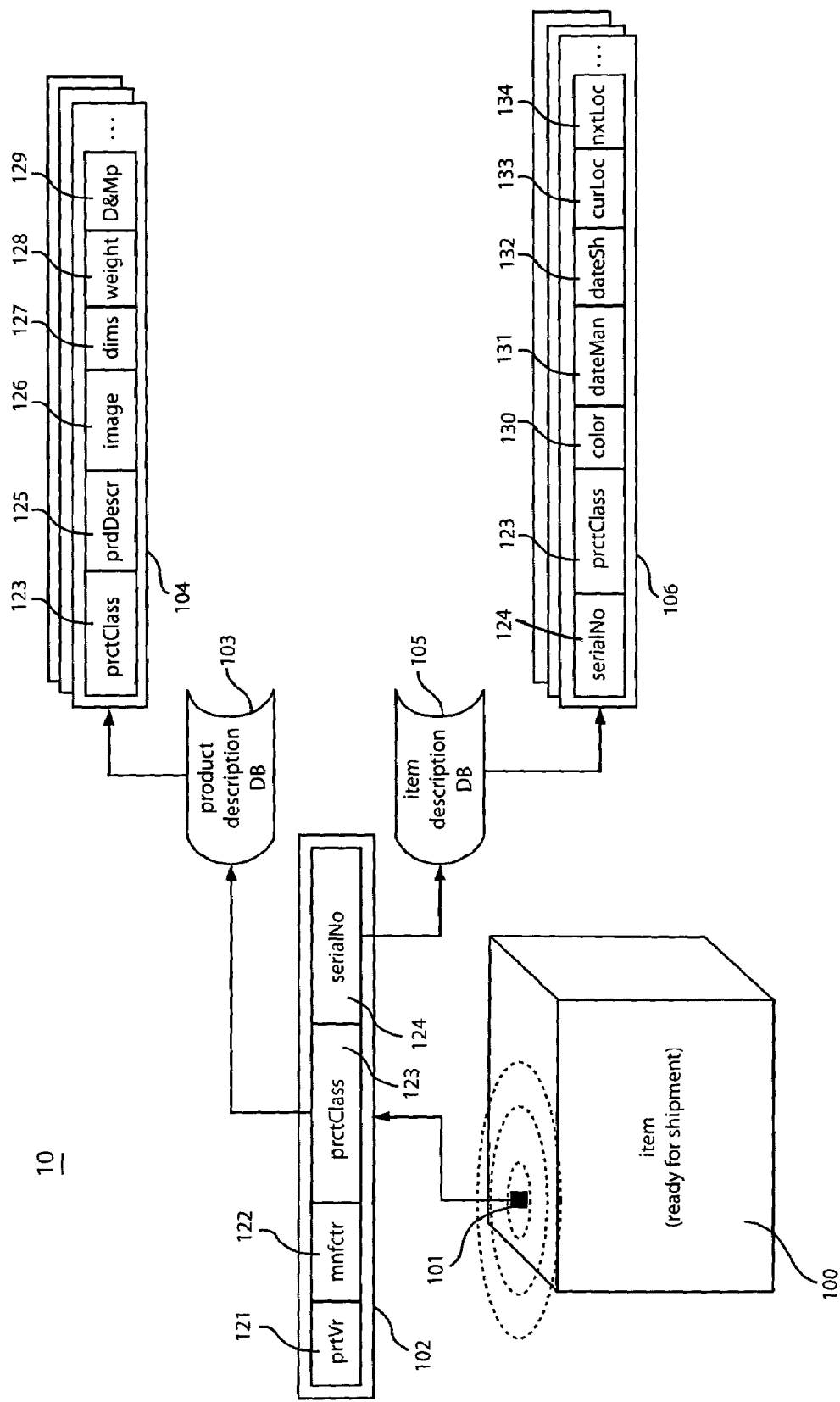
FIG. 1 shows an illustrative object ready for shipment with an RFID tag (or bar code) thereon, the information stored in the tag is used to retrieve information pertinent to this object from appropriate databases.

Referring now to the drawings in which like numerals represent the same or similar elements and initially to FIG. 1, an exemplary implementation 10 includes an item 100 ready to be shipped from one location to another. Item 100 may include a boxed product, e.g., a washing machine, an unboxed item, e.g., an automobile, a container of products or other objects. The concepts described herein are equally applicable to any of these alternatives and may be applied recursively at various levels, e.g., first at the level of a container shipped as a single unit by a shipping company, or the individual items inside the container prior to or after they have been removed from the container.

Item 100 is shown to be tagged with a radio frequency identification (RFID) tag or bar code tag 101. The RFID tag includes information 102 that can be used to retrieve information regarding the item 100. According to one embodiment, the information on the RFID tag 101 may include a protocol version (prtvr) identifier 121 describing the format of the information used by this RFID tag 101; a manufacturer (mnfctr) identifier 122 used to identify the manufacturer of the tagged item 100; a product classification (prctClass) identifier 123 used to identify the type of the tagged item 100, e.g., a washing machine; and a serial number (serialNo) identifier 124 used to identify the specific item 100.

The product classification identifier 123 and serial number identifier 124 may serve as pointers to product and specific item description databases 103 and 105, respectively. The product description database 103 includes information records 104 that describe the general characteristics of the item 100. According to one embodiment, information records 104 include information like an item description (prdDescr) 125; an image of the item (image) 126; the physical dimensions of the item (dims) 127; the weight of the item (weight) 128; and a pointer to design and manufacturing data (D&Mp) 129. The data 129 may provide information about the designer of the item, when it was originally designed, the locations it is being manufactured, etc. The various elements of a record 104 may point to additional records providing more detailed information. For example, the dimensions 127 and weight 128 elements may point to a data structure that includes the dimensions and weight of the item before and after it is being packaged in a carton box.

The item description database 105 includes information records 106 relevant to the specific item instance. According to one embodiment, the information records 106 may include color of the item (color) 130; the date that item 100 was manufactured (dateMan) 131; the data that the item was shipped (dateSh) 132; the item's current location (curLoc) 133; the item's next location (nxtLoc) 134, and so on.

As before, the various elements of a record 106 may point to additional records providing more detailed information. For example, the ship date and current location elements may point to data structures that provide information regarding all the inspection stations that the item has already gone through and the dates and times that they were inspected.

The information records in databases 103 and 105 identify the characteristics of the tagged item(s) 100. The information stored in the databases 103 and 105 will be used during the verification of the item.

Figure 2:
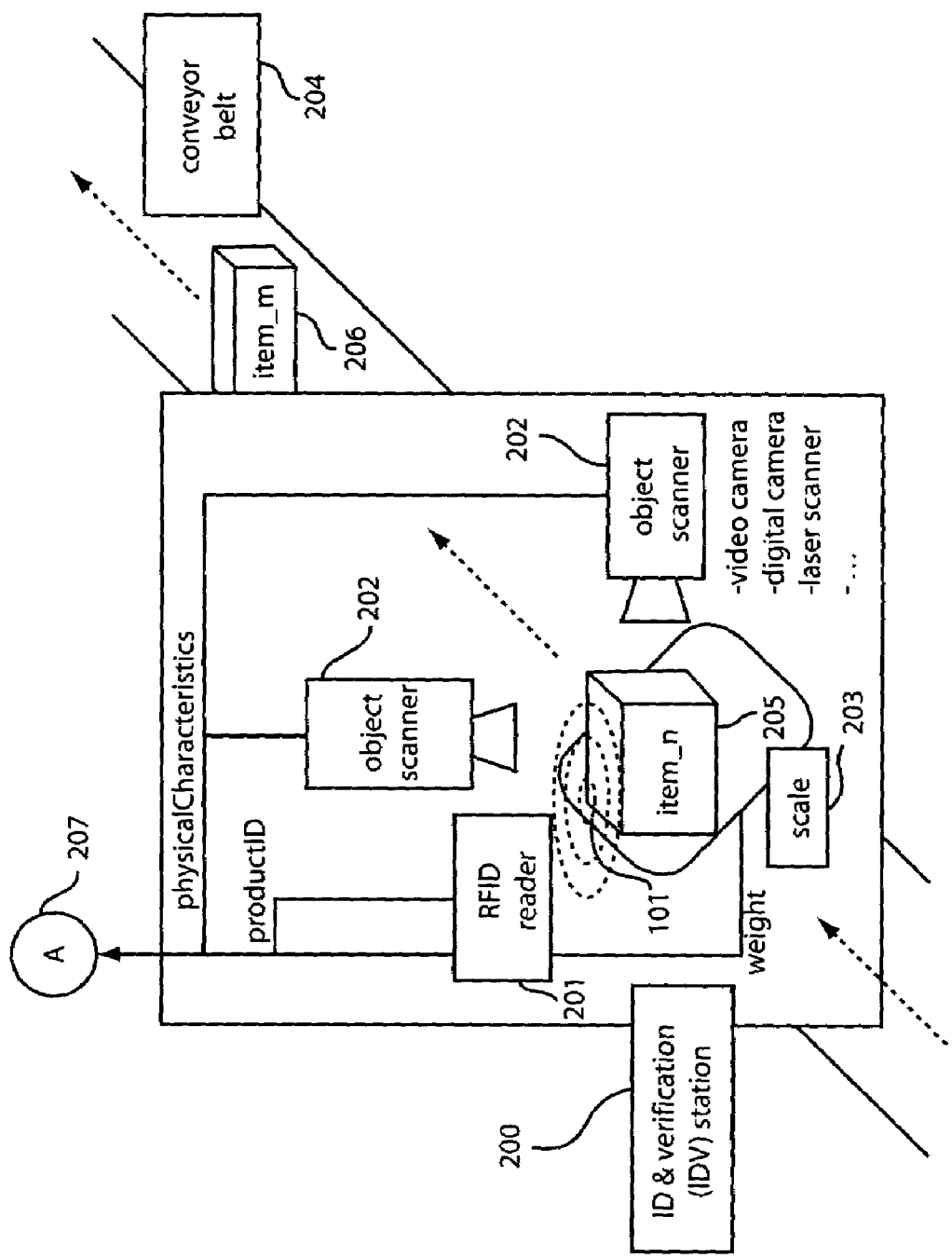
FIG. 2 shows an illustrative identification and verification station equipped with a number of measuring and sensing devices applied to objects passing therethrough.

Referring to FIG. 2, a particularly useful exemplary embodiment is shown for an identification and verification (IDV) station 200. Station 200 is employed to identify an item passing through station 200 and collect additional information to assist in the verification of the item.

In FIG. 2, items (e.g., 205 and 206) are placed on a conveyor belt 204 whose path passes through the IDV station 200. The IDV station 200 comprises an RFID reader 201 for reading RFID tags 101 attached onto the item 205, 206; a collection of object scanners 202, like a video camera, a laser scanner, etc.; and weighing scale 203, which can also be thought as a type of scanner.

The RFID reader 201 is used to read the information stored in the RFID tags 101 attached on the item 205, 206. This information is used for the identification of the item 205. The object scanners 202 and the weighting scale 203 are used to take snapshots of the physical characteristics of the product. Particularly, the video camera and the digital camera can be used to identify the color of the item as well as its relative size, compared with other known items in the picture, for example the item may be photographed as it passes in front of a measuring ruler, or other measurements or comparisons may also be made. The laser scanner can be used to obtain the 3D dimensions of the item. The cameras and the laser scanner can also assist in identifying deformities on item. X-rays or other irradiation techniques may incorporated into scanner 202 to retain a record of the internal contents and ensure no tampering has occurred especially in transit. The weighting scale is used of course to measure the weigh of the item. The measurements obtained from the RFID reader 201, the object scanners 202 and the weighting scale 203 feed a module 207, e.g., an identification and verification module described below.

Figure 3:
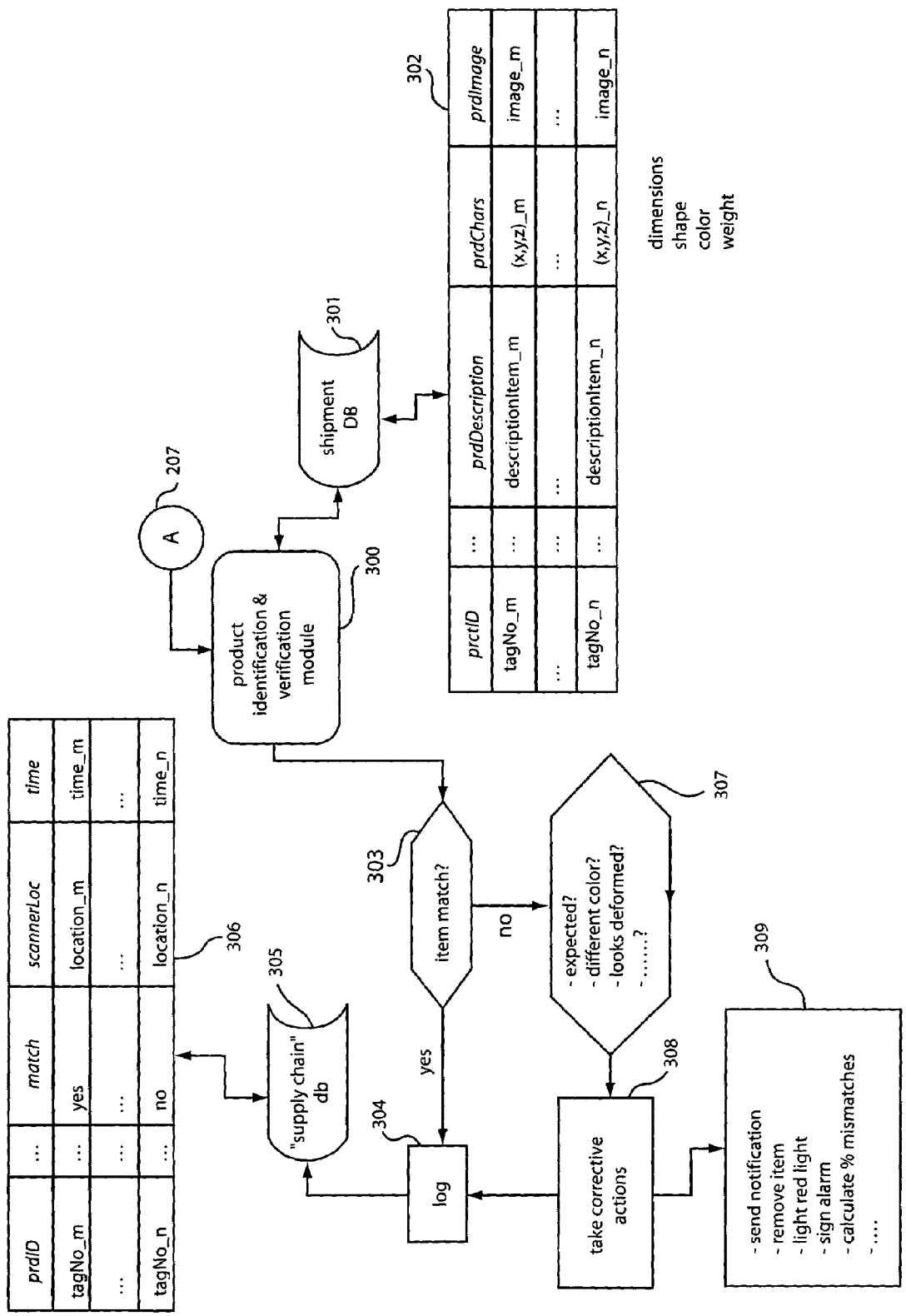
FIG. 3 shows an illustrative identification and verification process that correlates context data about the identified item with measuring and sensing information.

Referring to FIG. 3, a process to assist the identification and verification of the items that have passed through the IDV station 200 in FIG. 2 is illustratively shown. In the embodiment of FIG. 3, the object identification and verification module 300 uses the information read from the RFID tag 101 on the item 205 (FIG. 2) to retrieve information about this item from a shipment database 301. The shipment database 301 includes information about the items expected to be received or are maintained at a given location where the identification and verification operation occurs. According to one embodiment, shipment information is sent along the path of the shipping route to support the proper tracking of a shipped item. The shipment database 301 may include information records 302 describing the physical characteristics of the object (e.g., size, color, weight).

In one embodiment, the aforementioned information may reside on and be retrieved from a database (not shown) separate from the shipment database. Next, the item snapshot information derived when the item passed through the IDV station is matched in block 303 against any pertinent information record(s) in the shipment database 301. If a match exists, an event is logged in block 304 and an entry is made in a "supply chain" database 305. The supply chain database 305 maintains information records 306 pertinent to the shipping status of an item, e.g., the location and time the item was last scanned, whether it was an item expected at this location (match: "yes|"no"), etc.

If a match is not found, a type of mismatch is identified in block 307, for example, item not expected, mismatch in color, mismatch in shape, item deformed, contents added, contents removed, etc. Following the mismatch identification, a corrective action is taken in block 308. This may include disposing of an item, marking the item for further inspection, etc. The event is logged in block 304 and stored in the supply chain database 305, or in a separate database (not shown).

There are a number of corrective actions that can be taken in block 308. The embodiment in FIG. 3 shows a few possible ones in block 309 that may include sending a notification to anyone with the need to know of this mismatch event; the removal of the item from its current supply chain; light a warning light or sound an alarm at an inspection or monitoring station; feed information to an analysis module that calculates, for example, the percentage of mismatching, labeling the package, destroying the item, etc.

The embodiments shown and described herein are applicable to supply chain products in undocking stations at storage facilities. However, those skilled in the art could apply the core features of the present invention in other areas where automatic identification and verification is beneficial (e.g., to reduce the possibility that, for example, a visible defective part is automatically picked-up for assembly in an assembly line) without departing from the spirit of this invention.

Variations described for the present invention can be realized in any combination desirable for each particular application. Thus, particular limitations and/or embodiment enhancements described herein, which may have particular advantages to the particular application, need not be used for all applications. Also, it is to be understood that not all limitations need be implemented in methods, systems and/or apparatus including one or more concepts of the present disclosure.

The present illustrative embodiments can be realized in hardware, software, or a combination of hardware and software. Any kind of computer system—or other apparatus adapted for carrying out the methods and/or functions described herein—is suitable. A possible combination of hardware and software may include a general purpose computer system with a computer program that, when being loaded and executed, controls the computer system such that it carries out the methods described herein. The present system may also be embedded in a computer program product, which comprises all the features enabling the implementation of the methods described herein, and which—when loaded in a computer system—is able to carry out these methods.

"Computer program means" or "computer program" in the present context includes any expression, in any language, code or notation, of a set of instructions intended to cause a system having an information processing capability to perform a particular function either directly or after conversion to another language, code or notation, and/or reproduction in a different material form.

Thus, the present embodiments include an article of manufacture, which comprises a computer usable medium having computer readable program code means embodied therein for causing a function described above. The computer readable program code means in the article of manufacture comprises computer readable program code means for causing a computer to affect the steps of a method in accordance with this disclosure. Similarly, the present embodiments may be implemented as a computer program product comprising a computer usable medium having computer readable program code means embodied therein for causing a function described above.

The computer readable program code means in the computer program product comprises computer readable program code means for causing a computer to effect one or more functions of this invention. Furthermore, the present embodiments may be implemented as a program storage device readable by machine, tangibly embodying a program of instructions executable by the machine to perform method steps for causing one or more functions described herein.

It is to be understood that such individual components/methodologies may be implemented on one such computer system, or on more than one such computer system. In the case of an implementation in a distributed computing system, the individual computer systems and/or devices may be connected via a suitable network, e.g., the Internet or World Wide Web. However, the system may be realized via private or local networks. The embodiments are not limited to any particular network. For example, the implementation shown in FIG. 3 may convey information to multiple locations using secured or unsecured network communication to convey information over distance.

It is noted that the foregoing has outlined some of the more pertinent objects and embodiments. The concepts herein described may be used for many applications. Thus, although the description is made for particular arrangements and methods, the intent and concept of the invention is suitable and applicable to other arrangements and applications.

Having described preferred embodiments of a method and system for context-based automated product identification and verification (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for tracking a physical condition of an item, comprising:

a first station and a second station remotely disposed relative to one another, each including:
an object scanner configured to collect physical characteristics of an item and record the physical characteristics;
an identification reader configured to determine a unique identity of the item; and
a module configured to associate the physical characteristics with the unique identity of the item;
at least one comparison module configured to compare physical characteristics measured at the first station with physical characteristics measured at the second station to determine changes in a condition of the physical characteristics after the item has been shipped between the first and second stations;

the at least one comparison module including a mismatch determination module configured to compute an amount of a mismatch based on the changes in condition between physical characteristics measured between the first station and the second station and provide a corrective action based on the amount of mismatch; and a database, which stores the physical characteristics and the identity of the item wherein the database includes an item description database which stores information about the item including a current location and a next location.

2. The system as recited in claim 1, wherein the object scanner includes one or more of a camera and a scanner.

3. The system as recited in claim 1, wherein the object scanner includes a plurality of scanners to provide data in a plurality of dimensions.

4. The system as recited in claim 1, wherein the identification reader includes a radio frequency identification tag reader.

5. The system as recited in claim 1, wherein the identification reader includes a bar code reader.

6. The system as recited in claim 1, wherein the database includes a product description database, which stores information about the item including one or more of a classification of the item, a description of the item, an image of the item, a weight of the item, dimensions of the item, and/or a history of the item.

7. The system as recited in claim 1, wherein the item description database includes one or more of a classification of the item, a description of the item, a color of a product, a date of manufacture, and a shipping date.

8. The system as recited in claim 1, wherein the first and second stations are remote and share a database such tat comparing digital data of the item at a first time at the first station and a second time at the second station may be performed remotely.

9. The system as recited in claim 8, wherein the first and second stations share the database over a network.

10. The system as recited in claim 1, wherein the amount of mismatch includes a computed percentage.

* * * * *